(12) United States Patent
Erlund

(10) Patent No.: US 9,927,307 B2
(45) Date of Patent: Mar. 27, 2018

(54) PROBE

(71) Applicant: ROLLS-ROYCE plc, London (GB)

(72) Inventor: Mark N. Erlund, Lincoln (GB)

(73) Assignee: ROLLS-ROYCE plc, London (GB)

( * ) Notice: Subject to any disclaimer, the term of this patent is extended or adjusted under 35 U.S.C. 154(b) by 236 days.

(21) Appl. No.: 15/044,614

(22) Filed: Feb. 16, 2016

(65) Prior Publication Data

US 2016/0266009 A1    Sep. 15, 2016

(30) Foreign Application Priority Data

Mar. 11, 2015   (GB) .................................. 1504103.1

(51) Int. Cl.
    *G01K 13/02*   (2006.01)
    *G01D 21/02*   (2006.01)
    *G01K 1/14*    (2006.01)

(52) U.S. Cl.
    CPC ............. *G01K 13/028* (2013.01); *G01K 1/14* (2013.01); *G01K 13/02* (2013.01); *G01D 21/02* (2013.01)

(58) Field of Classification Search
    CPC ........... G01K 2013/024; G01K 13/028; G01K 13/02; G01L 19/0092
    See application file for complete search history.

(56) References Cited

U.S. PATENT DOCUMENTS

| 5,025,661 | A | 6/1991 | McCormack |
| 8,413,501 | B2 * | 4/2013 | Tavares .................. G01K 13/02 73/170.02 |
| 2005/0232332 | A1 | 10/2005 | Hanson et al. |

FOREIGN PATENT DOCUMENTS

| EP | 2693181 | A2 | 2/2014 |
| GB | 2246203 | A | 1/1992 |
| JP | 2002201960 | A * | 7/2002 |
| SU | 563586 | A1 | 6/1977 |

OTHER PUBLICATIONS

Jul. 21, 2016 Extended European Search Report issued in Patent Application No. 16155904.2.
Nov. 30, 2015 Search Report issued in British Patent Application No. 1504103.1.
Feb. 2, 2018 Office Action issued in European Patent Application No. 16155004.2.

* cited by examiner

*Primary Examiner* — Clayton E Laballe
*Assistant Examiner* — Leon W Rhodes, Jr.
(74) *Attorney, Agent, or Firm* — Oliff PLC

(57) ABSTRACT

A temperature and pressure probe (40) comprising an elongate outer tube (42) and elongate inner tube (56). Each tube having a peripheral wall (44, 58), a first open end (46, 60) and a second closed end (48, 62); the outer tube thereby defining an outer cavity (52) and the inner tube defining an inner cavity (66). The inner tube is located wholly within the outer cavity and is spaced from the outer peripheral wall (44) and second end (48). A temperature sensor (70) is located in the inner cavity. A pressure sensor (68) is located in the outer cavity. A vent pipe (76) is coupled between the inner peripheral wall and the outer peripheral wall, the vent pipe having a first end open to the inner cavity (66) and a second end open to vent outside the probe (40).

20 Claims, 5 Drawing Sheets

PROBE

The present disclosure concerns a temperature and pressure probe. Particularly a temperature and pressure probe for measuring the total temperature and total pressure of gas. The probe has applications in measuring total temperature and total pressure at locations in a gas turbine engine or other gas flow.

A so-called "Kiel" probe is known and is shown in FIG. 2. The Kiel probe 24 comprises a temperature sensor 26 and a shroud 28. The shroud 28 is annular and defines a cavity 30 into which fluid flow passes, as shown by arrows 32. The temperature sensor 26 is located at a closed end 34 of the cavity 30. The shroud 28 also includes one or more apertures 36, often an annular array of apertures 36, towards the closed end 34 of the cavity 30 through which fluid can flow out of the cavity 30, as shown by arrows 38. The probe arrangement controls the fluid flow in which the temperature sensor 26 is bathed by reducing the fluid flow velocity. The temperature sensor 26 is less sensitive to the incident angle of the fluid flow to the probe 24 and has a high recovery factor relative to an unshrouded probe.

Recovery factor (RF) is defined as the division of the difference between measured and static temperature by the difference between total and static temperature, thus:

$$RF = \frac{\text{Measured} - \text{Static}}{\text{Total} - \text{Static}}.$$

Static temperature is as if measured moving with the flow whereas total temperature is as if measured when the flow has been brought to a halt isentropically. Because it is not possible to exactly match flow speed to measure static temperature or to bring the flow to a complete halt as some movement is required to enable convective heat transfer, it is necessary to know the error in the measured temperature so that measurements may be corrected. The RF is used for this purpose.

One disadvantage of this arrangement of probe 24 is that the fluid flow that passes along the outside of the shroud 28 is not slowed by the constriction of the shroud and so travels more quickly and has a lower RF effect than the fluid flow 32 through the cavity 30. Consequently there is significant heat conduction from the temperature sensor 26 and its mounting stem through the shroud wall to the outside of the shroud 28. This means that the temperature measured by the temperature sensor 26 is lower than the total temperature.

A further disadvantage of the conventional Kiel probe 24 is that the amount by which the measured temperature differs from the total temperature is dependent on many factors including the temperature, pressure, speed and turbulence of the fluid flow. Thus it is non-trivial to determine the total temperature from the measured temperature, even with a known RF.

The conventional Kiel probe does not measure pressure.

The present invention provides a temperature and pressure probe that seeks to address the aforementioned problems.

According to a first aspect there is provided a temperature and pressure probe comprising:
an elongate outer tube having a peripheral wall, a first open end and a second closed end; the outer tube thereby defining an outer cavity;
an elongate inner tube having a peripheral wall, a first open end and a second closed end; the inner tube thereby defining an inner cavity; the inner tube being located wholly within the outer cavity and being spaced from the outer tube peripheral wall and the outer tube second end;
a temperature sensor located in the inner cavity;
a pressure sensor located in the outer cavity; and
a vent pipe coupled between the peripheral wall of the inner tube and the peripheral wall of the outer tube, the vent pipe having a first end open to the inner cavity and a second end open to vent outside the probe.

Advantageously the probe has uniform flow over the temperature sensor, in the inner cavity, and therefore accurately measures the total temperature of the flow. Advantageously the probe has stagnant fluid in the outer tube and therefore accurately measures total pressure. Advantageously the vent pipe vents the flow from the inner cavity. It also helps to locate the inner tube relative to the outer tube and to mechanically support the inner tube.

The peripheral walls of the inner and outer tubes may be spaced apart by a constant distance. The peripheral walls of the inner and outer tubes may be spaced apart by a constant distance only between the first end of the inner tube and the vent pipe. Alternatively peripheral walls of the inner and outer tubes may be spaced apart by a non-constant distance.

The peripheral wall of the outer tube may be cylindrical. Advantageously this is easy to manufacture. The peripheral wall of the outer tube may be a regular polygon in cross-section.

The peripheral wall of the inner tube may be cylindrical. Advantageously this is easy to manufacture. The peripheral wall of the inner tube may be a regular polygon in cross-section.

The peripheral wall of one or both of the outer tube and inner tube may vary in cross-section between its first end and second end. For example, the inner peripheral wall may be square or rectangular in cross-section around the temperature sensor but have a different cross-sectional shape towards the first and second ends of the inner tube.

The first end of the peripheral wall of the outer tube may comprise a chamfer towards the outer cavity. Thus the chamfer extends from the end surface to the inner surface of the outer peripheral wall. Advantageously the chamfer guides flow into the inner cavity. Advantageously the chamfer improves the probe's tolerance to angled flow upstream of the entrance to the probe, the first end of the outer tube. Advantageously the chamfer improves the boundary layer attachment of the flow.

The first end of the peripheral wall of the outer tube may comprise a chamfer away from the outer cavity. Thus the chamfer extends from the end surface to the outer surface of the outer peripheral wall. Advantageously the chamfer improves the boundary layer attachment of the flow to the outside of the outer peripheral wall. Advantageously the vent pipe vents into attached flow and not into a boundary layer separation bubble, so the pressure in the vent pipe is not adversely affected.

The probe may further comprise a support pin extending between the peripheral wall of the outer tube and the peripheral wall of the inner wall. Advantageously the support pin locates the inner tube relative to the outer tube. Advantageously the support pin mechanically supports the inner tube. Consequently the vent pipe may have a cross-sectional area for flow that is optimised to vent the inner cavity, rather than the vent pipe also being constrained by providing location and/or support to the inner tube.

The support pin may comprise a chamfered end where it contacts the peripheral wall of the inner tube. Alternatively the support pin may comprise a radiused end where it contacts the peripheral wall of the inner tube. Advantageously this reduces the heat conduction into the support pin away from the inner cavity.

The support pin may be located between the temperature sensor and the second end of the inner tube. The support pin may be longitudinally aligned with the vent pipe. Alternatively the support pin may be longitudinally offset from the vent pipe.

There may be more than one support pin. The support pins may be arranged as an array. They may be arranged as a longitudinal array, a circumferential array or a mixture.

The vent pipe may have a cross-section that is circular, oval, elliptical, teardrop shaped, aerofoil shaped or polygonal. The vent pipe may extend perpendicularly to the inner tube peripheral wall and to the outer tube peripheral wall. Advantageously this maximises the vent flow through the vent pipe for any given size of vent pipe.

The probe may comprise more than one vent pipe, the vent pipes being longitudinally spaced along the peripheral walls between the first and second ends of the inner tube to form an array. The probe may comprise more than one vent pipe, the vent pipes being angularly spaced around the peripheral walls between the first and second ends of the inner tube to form an array. The probe may comprise more than one vent pipe, the vent pipes being longitudinally and angularly spaced on the peripheral walls between the first and second ends of the inner tube to form an array. The vent pipes may form a regularly spaced array. Alternatively the vent pipes may form an irregularly spaced array. The vent pipes may form two or more arrays. The two or more arrays may be in known relationship together.

The vent pipe may be located between the temperature sensor and the second end of the inner tube. Advantageously the flow through the inner cavity all passes over the temperature sensor before being vented through the vent pipe.

The one or more support pin and the vent pipe may be angularly spaced around the peripheral walls to form an array. The one or more support pin and the vent pipe may be longitudinally spaced along the peripheral walls between the first and second ends of the inner tube to form an array. The one or more support pin and the vent pipe may be equally spaced apart. Alternatively they may be unequally spaced.

There may be more than one vent pipe. The one or more support pin and the vent pipes may be angularly spaced around the peripheral walls to form an array. The one or more support pin and the vent pipes may be longitudinally spaced along the peripheral walls between the first and second ends of the inner tube to form an array. The one or more support pin and the vent pipes may be equally spaced apart. Alternatively they may be unequally spaced.

The pressure sensor may be mounted in the second end of the outer tube. The pressure sensor may be mounted in the peripheral wall of the outer tube towards the second end. Advantageously both these locations are bathed in stagnant gas and therefore accurately measure total pressure of the gas.

The temperature sensor may comprise any one of the group comprising a thermocouple, a resistive temperature sensor, an optical temperature sensor, or a platinum resistance thermometer.

The probe may further comprise flow disrupter features on the inside surface of the peripheral wall of the inner tube between the first end and the vent pipe. The flow disrupter features may comprise any one or more of the group comprising dimples, fins, pedestals. Advantageously the flow disrupter features improve the heat conduction from the flow into the inner peripheral wall. Advantageously this causes the inner peripheral wall to be heated to the total temperature of the gas flow.

There may be more than one probe arranged in an array. An arrangement comprising an array of probes as described. The array of probes may be mounted to a dedicated rake. Alternatively the array of probes may be mounted to a component in a gas flow. The probes may be equally spaced in the array. Alternatively the probes may be unequally spaced to match particular locations of interest in the gas flow.

Also a gas turbine engine comprising a probe as described. Also a gas turbine engine comprising an arrangement, the arrangement comprising an array of probes.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Terms such as longitudinal, radial and circumferential are used in relation to cylindrical shapes. Where they are used in relation to non-cylindrical elongate prisms they are intended to have the equivalent meaning. Thus longitudinal is the direction along or parallel to the axis along which the prism extends. Radial is any direction which is perpendicular to that axis. Circumferential is the angular position around the axis. Thus a square-based prism has a non-constant radius which is maximal at each corner and minimal at the mid-point of each edge. Moving in a circumferential sense around the axis there will be corners at 90° intervals and a chord circumscribing arc swept by the intervening angular portions.

Figure 1:
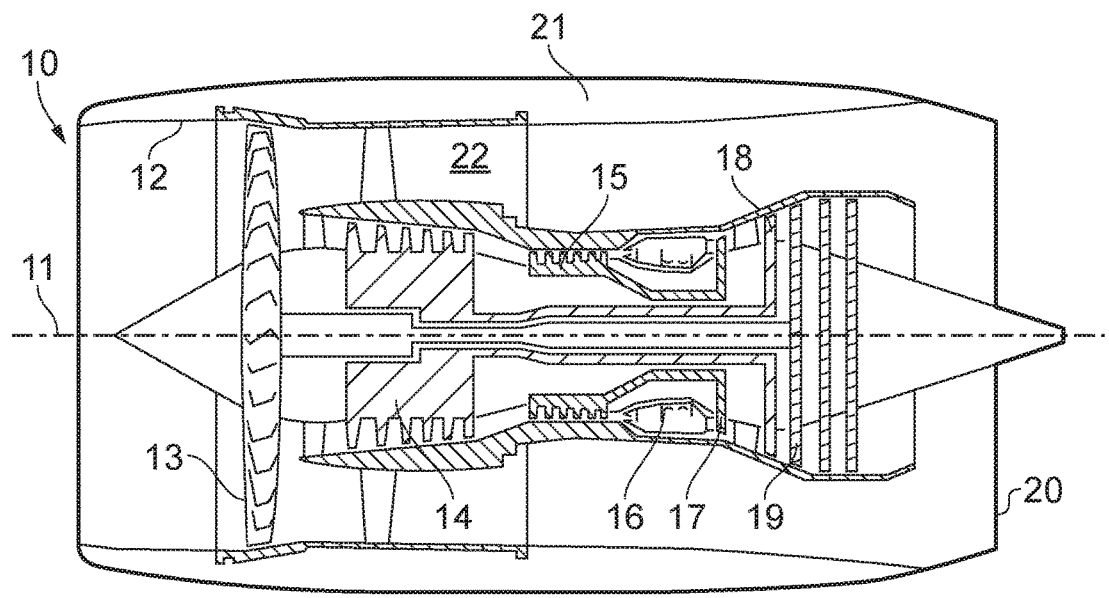
FIG. 1 is a sectional side view of a gas turbine engine.
Figure 2:
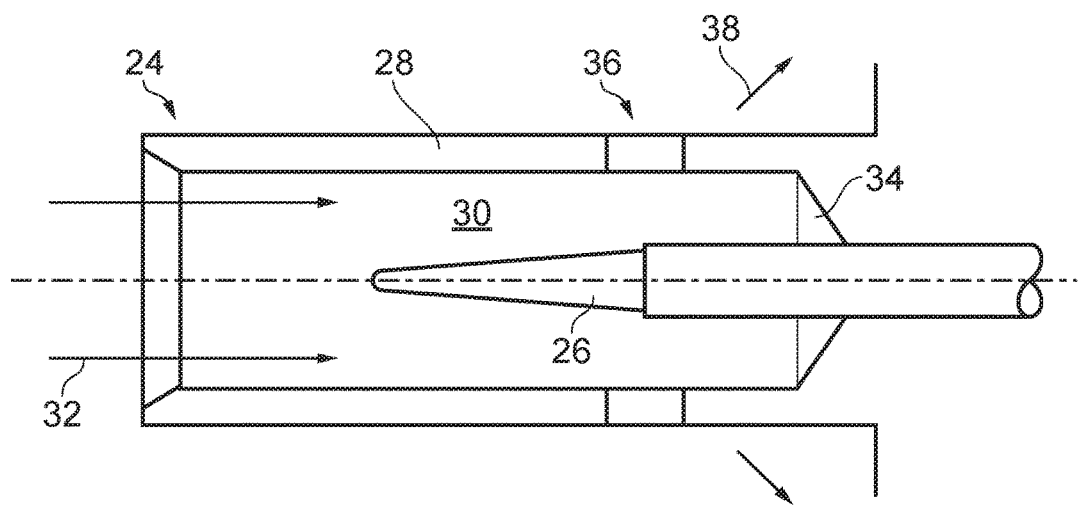
FIG. 2 is a schematic longitudinal section through a conventional Kiel probe.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high pressure compressor 15, combustion equipment 16, a high pressure turbine 17, an intermediate pressure turbine 18, a low pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high pressure compressor 15 is directed into the combustion equipment 16 where it is mixed with fuel and the mixture combusted. The resultant hot combustion products then expand through, and thereby drive the high, intermediate and low pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

A temperature and pressure probe may be mounted to static structure within the gas turbine engine 10 so that it receives working fluid flow through the engine during use. A probe may be located at any or all of the following locations in the gas turbine engine 10, or at any other location known to the skilled reader: the engine section stators between the fan 13 and the intermediate pressure compressor 14, the fan outlet guide vanes at the entrance to the bypass duct 22, at an intermediate location along the bypass duct 22, upstream of the intermediate pressure compressor 14, between the intermediate pressure compressor 14 and the high pressure compressor 15, between the high pressure compressor 15 and the combustor 16, downstream of any of the high pressure, intermediate pressure and low pressure turbines 17, 18, 19, and upstream of the low pressure turbine 19 where turbine gas temperature is conventionally measured.

Figure 3:
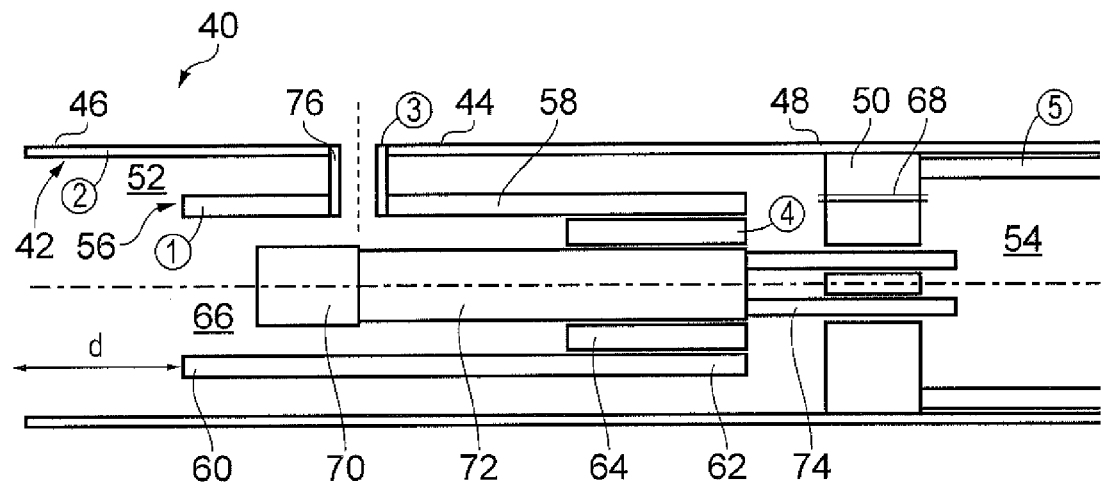
FIG. 3 is a schematic longitudinal section through a temperature and pressure probe.

A temperature and pressure probe 40 is schematically illustrated in FIG. 3. The probe 40 comprises an outer tube 42. The outer tube 42 is formed of a peripheral wall 44, a first end 46 which is open and a second end 48 which is closed. The second end 48 may be closed by a plug 50, for example an insulative board or ceramic bung. An outer cavity 52 is defined by the peripheral wall 44 and the closed second end 48. Thus the first end 46 defines an opening into the outer cavity 52.

The peripheral wall 44 may extend beyond the plug 50 at the second end 48 to form an open cavity 54. The cavity 54 may include processing equipment as will be described subsequently.

The peripheral wall 44 may be cylindrical. Thus the outer tube 42 is circular in cross-section and has constant radius at all longitudinal positions between the first end 46 and second end 48. Alternatively the peripheral wall 44 may be a longitudinal projection of a regular or irregular polygon, forming a polygonal prism. Thus the outer tube 42 may be oval, elliptical, triangular, square, rectangular, pentagonal, hexagonal or any other shape in cross-section. Preferably the cross-section is circular as this is easy to manufacture.

The probe 40 also comprises an inner tube 56. The inner tube 56 is formed of a peripheral wall 58, a first end 60 which is open and a second end 62 which is closed. The second end 62 may be closed by a plug 64. An inner cavity 66 is defined by the peripheral wall 58 and the closed second end 62. Thus the first end 60 defines an opening into the inner cavity 66.

The peripheral wall 58 may be cylindrical. Thus the inner tube 56 is circular in cross-section and has constant radius at all longitudinal positions between the first end 60 and second end 62. Alternatively the peripheral wall 58 may be a longitudinal projection of a regular or irregular polygon, forming a polygonal prism. Thus the inner tube 56 may be oval, elliptical, triangular, square, rectangular, pentagonal, hexagonal or any other shape in cross-section. Preferably the cross-section is circular as this is easy to manufacture.

The outer peripheral wall 44 may comprise a metal, for example stainless steel. Similarly the inner peripheral wall 58 may also comprise a metal, either the same as the outer peripheral wall 44 or a different metal. The plug 64 closing the second end 48 of the inner tube 56 may comprise a metal.

The inner tube 56 is located wholly within the outer cavity 52. Thus the first end 60 and second end 62 of the inner tube 56 are closer together than the first end 46 and second end 48 of the outer tube 42. Sequentially, from left to right as drawn, there is the first end 46 of the outer tube 42; the first end 60 of the inner tube 56; the second end 62 of the inner tube 56; and then the second end 48 of the outer tube 42. The first ends 46, 60 are spaced from each other. Likewise, the second ends 48, 62 are spaced from each other. The diameter of the inner tube 56 is smaller than the diameter of the outer cavity 42 so that the peripheral wall 58 of the inner tube 56 is spaced from the peripheral wall 44 of the outer tube 42. Where one or both the inner tube 56 and outer tube 42 are non-cylindrical, the same concept applies so that the peripheral walls 44, 58 and second ends 48, 62 are spaced from each other.

The inner tube 56 may be coaxial with the outer tube 42. Thus the inner tube 56 and outer tube 42 have a common axis. Where the inner tube 56 and outer tube 42 have the same shape the common axis means that the spacing between the peripheral walls 44, 58 is the same at all positions around and along the axis. For example, where the inner tube 56 and outer tube 42 are each cylindrical, a common axis means that the radial spacing between the peripheral walls 44, 58 is the same at every circumferential position around the axis and at every longitudinal position along the axis. Where the inner tube 56 has a different cross-sectional shape to the outer tube 42 the common axis means that there is a known spacing between the peripheral walls 44, 58 and a guaranteed minimum spacing.

The temperature and pressure probe 40 is suitable for measuring the total temperature and total pressure of a gas flow into which it is placed. The probe 40 is approximately aligned with the direction of gas flow so that gas enters the probe 40 via the open first end 46 of the outer tube 42. Some gas also flows past the outside of the probe 40. The gas may be air or another gas. Where the probe 40 is used in a gas turbine engine 10 the gas may be bypass air in the bypass duct 22, or may be partially or wholly compressed air in the compressor stages 14, 15 of the core of the engine 10, or may be combustion gases that have exited the combustor 16, or may be partially or wholly expanded combustion gases in the turbine stages 17, 18, 19 of the core of the engine 10.

A flow direction is defined from left to right as illustrated, being from the open first ends 46, 60 towards the closed second ends 48, 62. The gas enters the probe 40 via the first end 46 of the outer tube 42. The first end 60 of the inner tube 56 is spaced longitudinally back from the first end 42 of the outer tube 42 by a sufficient length that the flow tends towards stable and uniform when it reaches the first end 60 of the inner tube 56. Thus the forward portion of the outer cavity 52 is provided to correct for different flow directions on arrival at the intake, first end 46 of the outer tube 42, and to deliver more uniform flow deeper into the probe 40.

Figure 4:
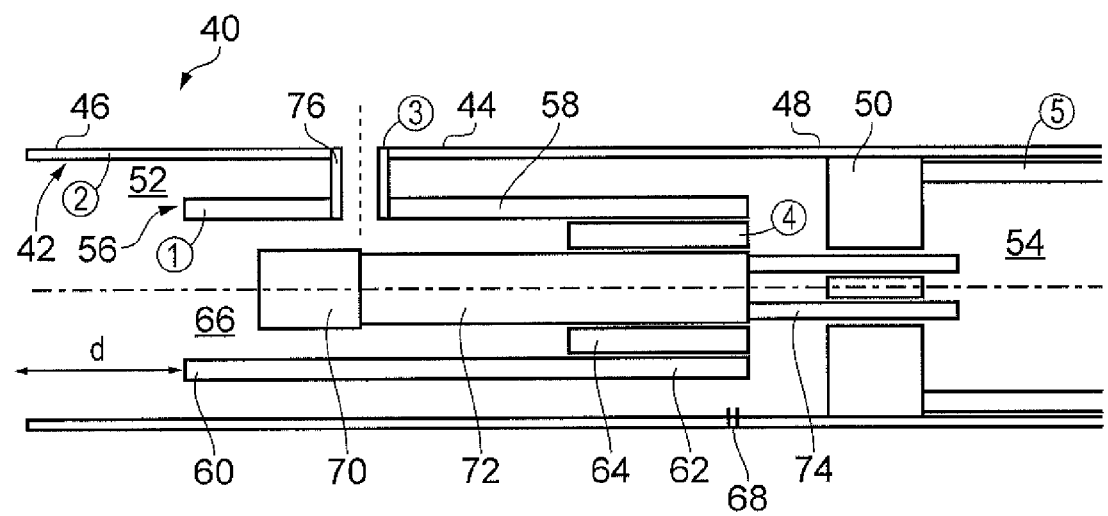
FIG. 4 is a schematic longitudinal section through a temperature and pressure probe.

The gas flowing into the outer cavity 52 around the outside of the inner peripheral wall 58 is gradually brought to a halt and stagnates towards the back of the outer cavity 52, that is the part close to the second end 48. A pressure sensor 68 is positioned at the rear of the outer cavity 52. The pressure sensor 68 may have the form of a tapping, a small diameter tube, through the outer tube 42 and pneumatically connects the interior of the outer cavity 52 to measurement and processing equipment to determine the total pressure of the gas flow. Thus the pressure sensor 68 may be located at the probe 40 or may be remotely located and pneumatically linked to the probe 40. The pressure sensor 68 may be provided in the second end 48 of the outer tube 42, for example as a tapping through the plug 50, as illustrated in FIG. 3. Alternatively it may be provided in the outer peripheral wall 44 towards the rear of the outer cavity 52, that is towards the second end 48 of the outer tube 42 as illustrated in FIG. 4. FIG. 4 is the same as FIG. 3 except for the location of the pressure sensor 68.

The pressure measured by the pressure sensor 68 being located towards the rear of the outer cavity 52 is close to the total pressure because it measures pressure in gas which is stagnant rather than flowing. Thus errors in the measurement are reduced. It will be understood that different pressure sensors 68, including remotely located pressure sensors coupled to tappings in the probe 40, may be appropriate for different applications of the probe 40.

Located within the inner cavity 66 is a temperature sensor 70. A platinum resistance temperature (PRT) sensor is shown in the figures. The temperature sensor 70 is mounted from the plug 64 forming the second, closed end 62 of the inner tube 56, for example using a mount stem 72. The temperature sensor 70 is arranged so that it is spaced from the peripheral wall 58 and the plug 64 and is thus bathed in the gas flow in the inner cavity 66. The mount stem 72 may comprise wires 74 to transmit the temperature measurement, with suitable insulation and stiffening, or may comprise a sheath or rod to which the temperature sensor 70 is mounted.

Wires 74 pass from the temperature sensor 70 through the mount stem 72 and through the back of the outer cavity 52 to the plug 50. A printed circuit board or other processing is provided to which the wires 74 are attached. The plug 50 may comprise the printed circuit board, or the printed circuit board may be attached to the plug 50 or it may be provided in the cavity 54 behind the plug 50. Where the probe 40 is located in a hot environment the printed circuit board may be provided externally to the probe 40, in a more benign environment, with suitably insulated wires 74 connecting the temperature sensor 70 and printed circuit board. Where the processing is located remotely from the probe 40 it may be beneficial to pass the pressure measurement to the same remote processing, for example along a tube or pipe, rather than have separate processing for the two measurements.

The wires 74 may be formed from silver, copper, constantan (a copper nickel having a low coefficient of resistivity) or another material as is appropriate for the specific application of the probe 40 that is contemplated. The mount stem 72 acts to isolate the temperature sensor 70 from strains transmitted by movement of the wires 74.

The temperature sensor 70 may be a platinum resistance thermometer (PRT). Alternatively it may be a thermocouple, resistive sensor or optical temperature sensor, for example a fibre optic sensor. It will be understood that different temperature sensors 70 may be appropriate for different applications of the probe 40.

It may be beneficial to arrange the peripheral wall 58 of the inner tube 56 to be rectangular or square in cross-section for at least that portion immediately surrounding the temperature sensor 70. Advantageously this provides parallel flow over the temperature sensor 70. The portions of the peripheral wall 58 away from the temperature sensor 70, towards the first end 60 and second end 62, may have a different cross-sectional shape such as circular with the peripheral wall 58 arranged to smoothly blend from one shape to another over its length in the longitudinal direction.

Advantageously the stagnation of the flow in the outer cavity 52 thermally isolates the inner cavity 66, and thus the temperature sensor 70, from the flow external to the probe 40. It also isolates the inner cavity 66, and thus the temperature sensor 70, from the heat conduction effects of the external flow passing over the peripheral wall 44 of the outer tube 42. Therefore the temperature measured by the temperature sensor 70 is at or close to the total temperature of the gas.

Flow through the inner cavity 66 is maintained by the provision of a vent pipe 76. The vent pipe 76 is a small diameter pipe which is open at both ends. It has one end open to the inner cavity 66 and the other end open to the outside of the probe 40, that is outside the outer peripheral wall 44. The vent pipe 76 may be mounted between the inner peripheral wall 58 and the outer peripheral wall 44, and penetrates both walls 44, 58. Thus one end penetrates through the inner peripheral wall 58 in order to receive gas flow from the inner cavity 66. Preferably the end of the vent pipe 76 is flush with the inner surface of the inner peripheral wall 58 so that it does not protrude into the inner cavity 66 and thereby disrupt flow therein. The other end of the vent pipe 76 penetrates through the outer peripheral wall 44 in order to expel gas flow outside the probe 40, into the external flow past the probe 40. The end may be flush with the outer surface of the outer peripheral wall 44 or may protrude further. The vent pipe 76 traverses the outer cavity 52 but the flow through it does not interact with the gas in the outer cavity 52.

The vent pipe 76 may comprise the same material as the inner peripheral wall 58, the outer peripheral wall 44 or both. Thus the vent pipe 76 may comprise a metal such as stainless steel. Alternatively the vent pipe 76 may comprise a different material such as ceramic, acrylic or nickel-based high-temperature low creep superalloys such as Nimonic steels. The choice of material may be dependent on the temperature of the operating environment envisaged for the probe 40.

The vent pipe 76 may be arranged perpendicularly to each of the inner and outer peripheral walls 58, 44. Advantageously this minimises the length of the vent pipe 76 which enables the maximum vent flow for a given size and therefore reduces pressure loss. Indirectly there is also reduced heat soaking because the dwell time of the flow in the vent pipe 76 is shorter. The primary purpose of the vent pipe 76 is to vent the inner cavity 66 so that there is gas flow, rather than stagnation, in the inner cavity 66 so that the temperature sensor 70 measures total, not static, temperature. However, a secondary purpose of the vent pipe 76 is to locate and mechanically support the inner tube 56, particularly the inner peripheral wall 58, relative to the outer tube 42, particularly the peripheral wall 44 thereof. By aligning the vent pipe 76 perpendicularly to each of the inner and outer peripheral walls 58, 44 it provides a more rigid or stiff mounting of the inner tube 56 relative to the outer tube 42.

The vent pipe 76 has thin walls so that the cross-sectional area of the material from which they are formed is small and therefore the heat conduction path is minimal. The vent pipe 76 is heated towards the total temperature by the flow through it and thus the heat loss from the inner peripheral wall 58 to the outer peripheral wall 44 is reduced.

The vent pipe 76 is located at a longitudinal position between the temperature sensor 70 and the plug 64 at the second end 62 of the inner tube 56. It must be behind the temperature sensor 70, in terms of the flow direction, to ensure that the temperature sensor 70 is bathed in moving gas flow. It must be in front of, upstream of, the plug 64 in order to fulfill its venting purposes. There is no constraint on the circumferential position of the vent pipe 76 around the inner and outer peripheral walls 58, 44.

The vent pipe 76 may be a cylindrical pipe with small diameter bore. Alternatively it may have a different cross-sectional shape. For example, it may be oval, elliptical, tear drop shaped or aerofoil shaped in cross-section. A curved profile, at least on the part of the vent pipe 76 facing the first end 46 of the outer cavity 52, reduces any adverse effects on flow in the outer cavity 52 as the gas slows into stagnation through the outer cavity 52, which improves the transient response of the probe 40.

There may be more than one vent pipe 76. Advantageously each vent pipe 76 may be smaller because the total flow requirement remains the same but is shared between two or more vent pipes 76. Advantageously the structural support functionality is shared between the vent pipes 76 and so the load carried by each vent pipe 76 is reduced proportionately where there are two or more vent pipes 76.

There may be two or more vent pipes 76 provided in a circumferential array. The vent pipes 76 may be equi-angularly spaced around the inner and outer peripheral walls 58, 44. For example two vent pipes 76 may be spaced 180° apart or three vent pipes 76 may be spaced 120° apart. Alternatively the angular spacing between pairs of vent pipes 76 may be irregular, for example in order to expel the flow to specific angular locations outside the probe 40 or to avoid expelling flow at particular angular locations.

Two or more vent pipes 76 may be provided in a longitudinal array. Thus pairs of the vent pipes 76 may be longitudinally spaced apart so that one is closer to the first end 60 of the inner tube 56 than the other.

Two or more vent pipes 76 may be arranged in an array which is both longitudinal and circumferential. Thus pairs of vent pipes 76 may be longitudinally and/or circumferentially spaced. For example, a line drawn through the junction of each vent pipe 76 with the inner cavity 66 may form a helix about the inner peripheral wall 58. Alternatively two or more vent pipes 76 may form a first equally spaced circumferential array at one longitudinal position and another two or more vent pipes 76 may form a second equally spaced circumferential array at a second longitudinal position. The vent pipes 76 in the second array may be circumferentially offset from the vent pipes 76 in the first array. Other arrangements of the array or arrays of vent pipes 76 are also feasible.

The first end 60 of the inner tube 56 is longitudinally spaced downstream, in the flow direction, from the first end 46 of the outer tube 42 by a distance d. The distance d is arranged such that any turbulence in the gas flow that enters the first end 46 of the outer tube 42 is partially dissipated before the flow enters the first end 60 of the inner tube 56. Thus the inner cavity 66 receives more uniform flow. The distance d also ensures that any boundary layer separation caused by the first end 60 of the inner tube 56 is not large enough to cover the outer cavity 52, which would reduce the pressure measurement obtained by the pressure sensor 68.

This is because the boundary layer is reattached ahead of the first end 60 of the inner tube 56.

The distance d need not be large to produce the laminar flow. For example, the distance d may be equal to or smaller than the diameter of the inner cavity 66.

Similarly the temperature sensor 70 is spaced longitudinally downstream, in the flow direction, from the first end 60 of the inner tube 56 so that the gas flow to which it is exposed is more uniform.

Figure 5:
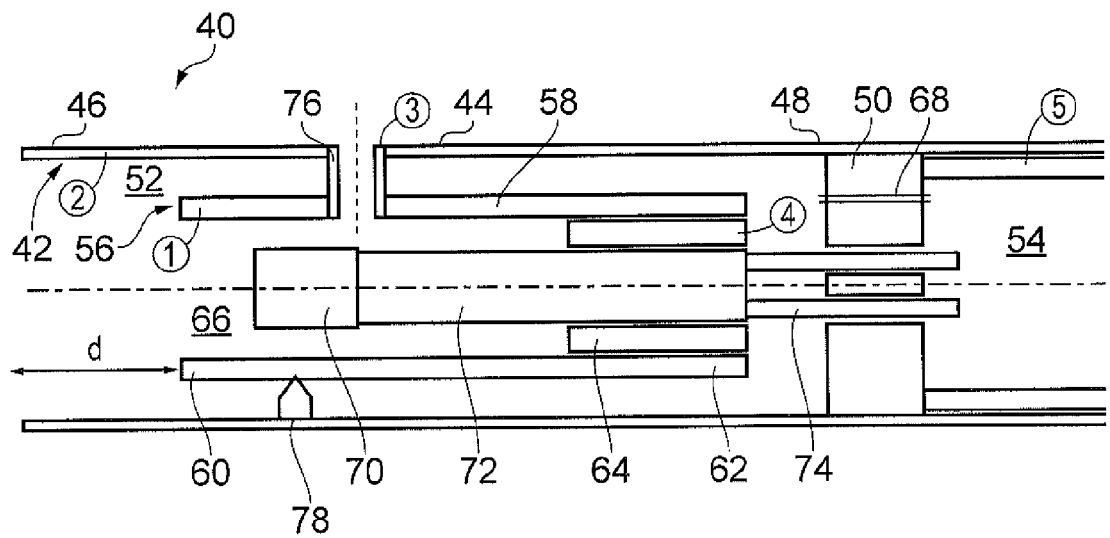
FIG. 5 is a schematic longitudinal section through a temperature and pressure probe.

FIG. 5 is similar to FIG. 3 and illustrates an optional feature of the probe 40. It could alternatively have the pressure sensor 68 positioned as in FIG. 4 instead. In addition to the one or more vent pipes 76 there is provided a support pin 78. The support pin 78 provides at least some of the location and mechanical support function in addition to or instead of the vent pipes 76. Advantageously each vent pipe 76 may be smaller because the structural support requirement remains the same but is shared between one or more vent pipes 76 and the support pin 78. Advantageously the vent pipes 76 may thus be optimised for the flow requirements without the additional sizing constraint of the structural support requirement.

The support pin 78 may be a solid cylinder. Alternatively it may have a different cross-sectional shape, such as oval, elliptical, tear drop shaped or aerofoil shaped. It may be the same shape as the one or more vent pipes 76. The support pin 78 may be hollow. However, in this case it has an entirely closed shell so that there is no flow path into its interior.

The support pin 78 may be integrally formed with or mounted and secured to the outer peripheral wall 44. It may be integrally formed with or mounted and secured to the inner peripheral wall 58. Alternatively it may be configured to abut or rest against the inner peripheral wall 58 without being secured thereto. In this case the inner end of the support pin 78 may be tapered to a point as drawn in FIG. 5. Advantageously this minimises the thermal conduction from the inner peripheral wall 58 into the support pin 78 and thus away from the inner cavity 66. The same benefit may be obtained by forming the support pin 78, or at least the inner end of it, from a thermally insulative material or coating it in a thermally insulative material.

The support pin 78 may be longitudinally aligned with the one or more vent pipes 76 or may be longitudinally spaced from any or all of the vent pipes 76. Where the support pin 78 is longitudinally aligned with the one or more vent pipes 76 it is angularly spaced from the vent pipes 76. For convenience the support pin 78 is illustrated diametrically opposite to a vent pipe 76 in FIG. 5. However, it may alternatively be at any other angular spacing. For example, there may be two vent pipes 76 and one support pin 78 which together form a regular circumferential array where the spacing between the two vent pipes 76 and between each vent pipe 76 and the support pin 78 is 120°.

There may be more than one support pin 78. Advantageously the structural support functionality is shared between the support pins 78, and also with the vent pipes 76, and so the load carried by each support pin 78 is reduced proportionately where there are two or more support pins 78.

There may be two or more support pins 78 provided in a circumferential array. The support pins 78 may be equi-angularly spaced around the inner and outer peripheral walls 58, 44. For example two support pins 78 may be spaced 180° apart or three support pins 78 may be spaced 120° apart. Alternatively the angular spacing between pairs of support pins 78 may be irregular.

Two or more support pins 78 may be provided in a longitudinal array. Thus pairs of the support pins 78 may be longitudinally spaced apart so that one is closer to the first end 60 of the inner tube 56 than the other.

Two or more support pins 78 may be arranged in an array which is both longitudinal and circumferential. Thus pairs of support pins 78 may be longitudinally and/or circumferentially spaced. For example, a line drawn through the junction of each support pin 78 with the inner peripheral wall 58 may form a helix about the inner peripheral wall 58. Alternatively two or more support pins 78 may form a first equally spaced circumferential array at one longitudinal position and another two or more support pins 78 may form a second equally spaced circumferential array at a second longitudinal position. The support pins 78 in the second array may be circumferentially offset from the support pins 78 in the first array. Other arrangements of the array or arrays of support pins 78 are also feasible.

The one or more support pins 78 and the one or more vent pipes 76 may form arrays together or may form separate arrays. Where they form separate arrays there is preferably a defined relationship between the arrays.

Figure 6:
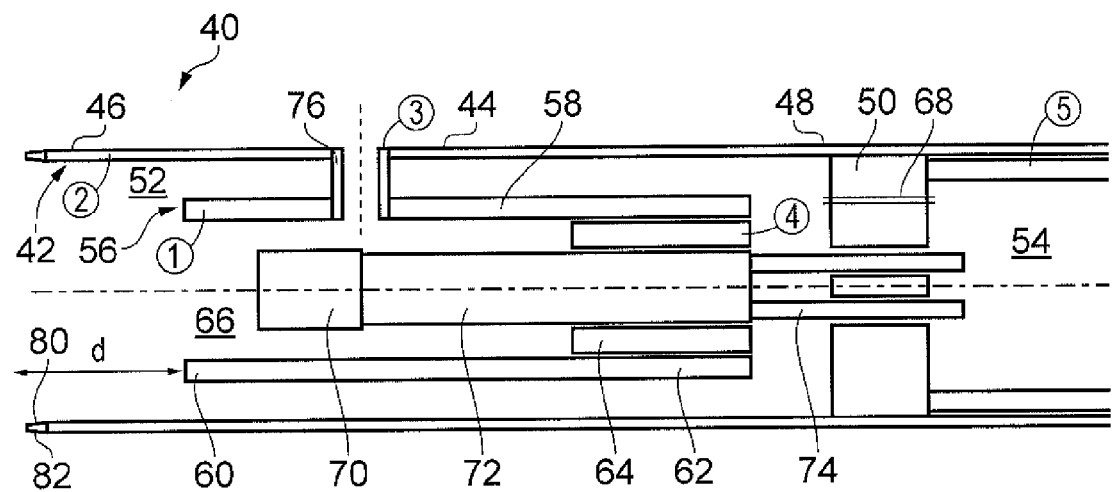
FIG. 6 is a schematic longitudinal section through a temperature and pressure probe.

FIG. 6 illustrates a further optional feature of the probe 40. FIG. 6 is otherwise similar to FIG. 3. It may have the pressure sensor 68 positioned as shown or as in FIG. 4 and may include one or more support pins 78 as described in relation to FIG. 5. The first end 46 of the outer tube 42 includes an inner chamfer 80. The inner chamfer 80 changes the shape of the first end 46 of the outer tube 42 from being a right angle between the inner surface and the end surface to having an angled portion joining the end surface and inner surface. The angle of the inner chamfer 80 may be tailored as appropriate for the specific application of the probe 40 contemplated.

Beneficially the inner chamfer 80 guides the flow into the outer cavity 52 and thence into the inner cavity 66. It also makes the probe 40 more tolerant to flow which is angled across the first end 46 of the outer tube 42 at ingress. Advantageously this may reduce the required number of probes 40 or remove a requirement for active realignment of probes 40 in applications where the flow direction changes during use. The inner chamfer 80 also improves attachment of the boundary layer of the flow, which results in more uniform flow entering the outer cavity 52 where its cross-sectional area is reduced by the presence of the inner tube 56. Thus the outer cavity 52 can be smaller than is necessary without the inner chamfer 80.

Optionally the first end 46 of the outer tube 42 also or alternatively includes an outer chamfer 82. Similarly to the inner chamfer 80, the outer chamfer 82 changes the shape of the first end 46 of the outer tube 42 from being a right angle between the outer surface and the end surface to having an angled portion joining the end surface and outer surface. The angle of the outer chamfer 82 may be tailored as appropriate for the specific application of the probe 40 contemplated.

Beneficially the outer chamfer 82 improves attachment of the boundary layer on the outside of the outer peripheral wall 44. Advantageously this reduces the boundary layer separation bubble which can affect the pressure at the outside ends of the vent pipes 76.

Either or both of the inner chamfer 80 and outer chamfer 82 could be replaced by a radius instead of a chamfer.

Optionally a further, inner, chamfer may be provided on the first end 60 of the inner peripheral wall 58 directed between the end surface and the inner surface. Advantageously such a chamfer improves the boundary layer attachment in the inner tube 56. Since there is no flow in the outer tube 42 there is little benefit to providing an outer chamfer on the first end 60 of the inner peripheral wall 58.

It is preferable that the spacing between the inner and outer peripheral walls 58, 44 is constant, at least between the first end 46 of the outer tube 42 and the vent pipe 76. Advantageously this makes the flow more uniform as it passes into and through the inner cavity 66 over the temperature sensor 70.

Since the probe 40 is essentially a pair of nested tubes it can be manufactured by extrusion. It is therefore possible to make the whole probe 40 with a small outside diameter, for example smaller than 5 mm. This is smaller than is possible if the tubes 42, 56 must be rolled or produced in other ways. It is also smaller than a known temperature probe which is held in a hollow shroud with closed front end so that the temperature sensor is thermally isolated from passing flow. Advantageously extrusion is an accurate and repeatable method of manufacture. Advantageously the resultant probe 40 is more compact than known temperature probes or combined pressure and temperature probes. Thus it can be more easily incorporated into gas flows with minimal disruption to the flow patterns.

Previous combined pressure and temperature probes have been poor at recovering total pressure. Advantageously the probe 40 described herein recovers pressure that is near total pressure whilst also recovering total temperature. Thus it is more accurate for both pressure and temperature measurements than known combined probes.

Previously it was necessary to provide separate pressure and temperature probes in order to have accurate measurements of both. Therefore the probe 40 as described herein reduces the instrumentation necessary, for example halving the number of probes 40 required to obtain the same number of measurements. The 'footprint' of the probes 40 is less than half that for the equivalent set of pressure probes and temperature probes because the outside diameter is smaller than the known temperature probes.

The inner peripheral wall 58 may comprise dimpling on its inner surface, between the first end 60 and the longitudinal position of the one or more vent pipes 76. The dimpling helps to heat the inner peripheral wall 58 to close to the total temperature of the fluid flow. The dimples provide flow disruption of the moving gas. There is therefore no flow disruption benefit to providing dimpling on the surfaces of the peripheral walls 44, 58 facing the outer cavity 52, in which the gas is stagnant, or on the portion of the inner surface of the inner peripheral wall 58 that is downstream of the vent pipes 76 because the gas there is also relatively stagnant. There may be other benefits to providing dimples on other surfaces, for example it may be cheaper to manufacture an inner tube 56 which has dimpling on the whole of its inner surface rather than on only part of it. Alternative flow disrupters, such as fins or pedestals, may be envisaged by the skilled reader.

Figure 7:
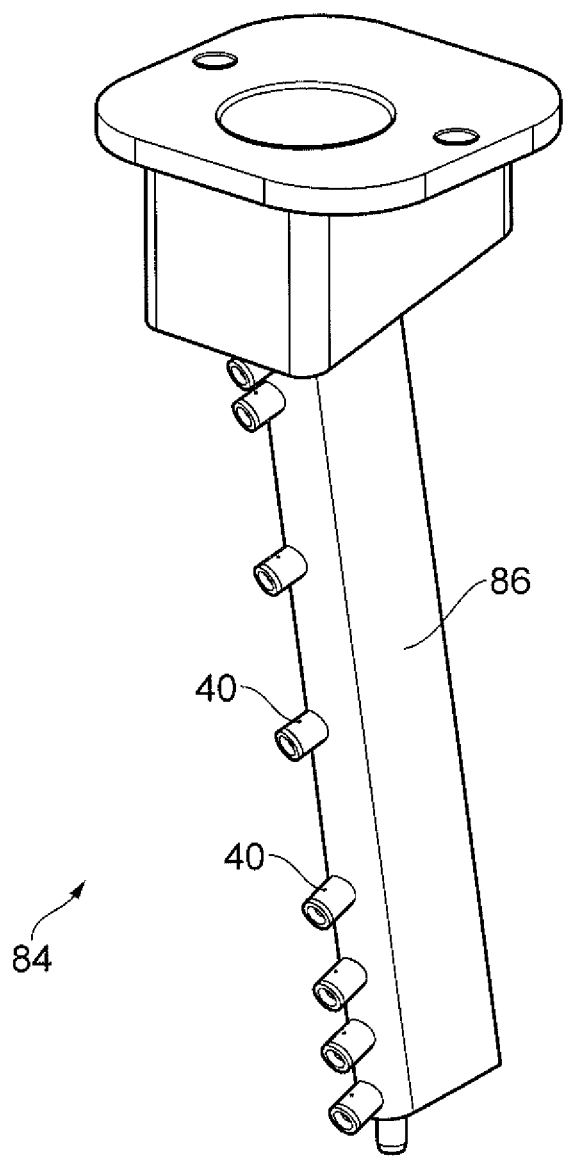
FIG. 7 is a perspective view of an array of temperature and pressure probes.
Figure 8:
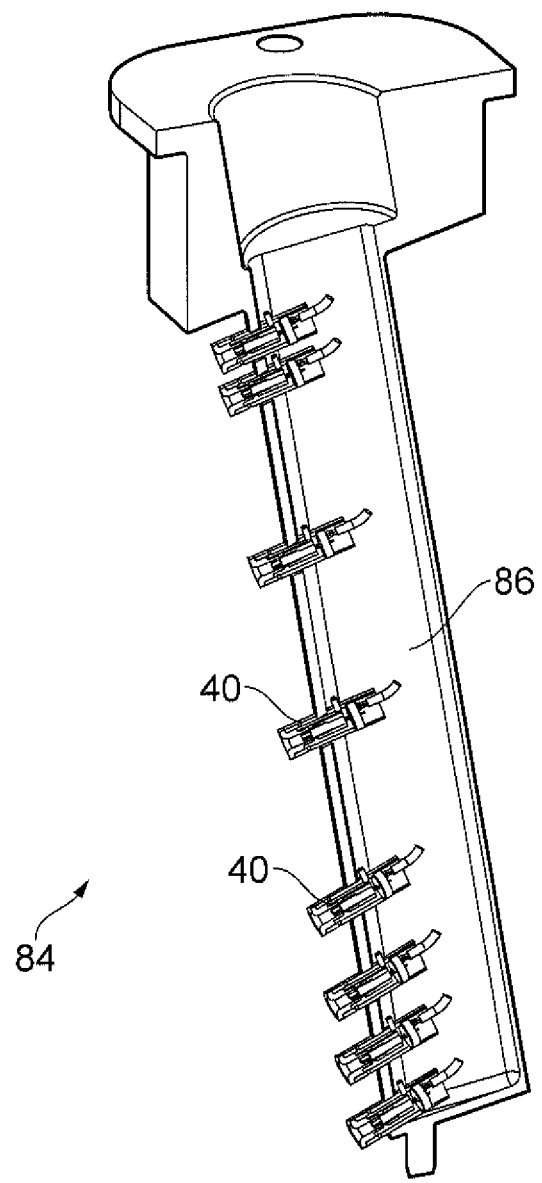
FIG. 8 is a cut-away perspective view of the array of temperature and pressure probes shown in FIG. 7.

FIG. 7 and FIG. 8 illustrate an arrangement having an array 84 of probes 40 as previously described. The array 84 is illustrated as a linear array that could be positioned, for example, on the leading edge of an engine section stator between the fan 13 and the intermediate pressure compressor 14 so that each temperature and pressure probe 40 is at a different radial distance from the centre line of the gas turbine engine 10.

Each temperature and pressure probe 40 within the array 84 comprises the features previously discussed and may comprise the optional features also discussed. In some applications it will be appropriate that all the probes 40 in the array 84 are identical; in other applications the probes 40 may differ from each other, for example some of the probes 40 including the pressure sensor 68 through the plug 50 and some including the pressure sensor 68 through the outer peripheral wall 44.

The spacing of the temperature and pressure probes 40 within the array 84 may be regular or irregular as is appropriate for the application as will be apparent to the skilled reader. The array 84 may be annular or another non-linear shape.

The array 84 of probes 40 may be mounted to a dedicated rake 86. The rake 86 may then be mounted in the gas flow so that the probes 40 receive gas into their first ends 46. Alternatively the probes 40 may be mounted directly to components that are in the gas path. The probes 40 may be mounted so that they protrude from the rake 86 or component; alternatively they may be mounted so that they are flush with the surface of the rake 86 or component.

In a gas turbine engine 10 an array 84 of temperature and pressure probes 40 may be provided in any or all of the following locations: outlet guide vanes, stator vanes, compressor blades, turbine blades. The probes 40 may be located on or in the leading edge of aerofoil components. Alternatively they may be located at other positions on the aerofoil. Where the probes 40 are located on rotating components the processing equipment, and the devices which receive the measurements from the probe 40, must either also be located on the rotating component or a rotating-rotating or rotating-static signal interface will be required, as will be apparent to the skilled reader.

Although gas flow has been described, liquid flow may also be measured if the heat transfer coefficient is insufficient to measure the total temperature of the liquid by other means.

The temperature and pressure probe 40 has been described for gas turbine engine 10 applications. However, the probe 40 finds utility in other applications where it is desirable to measure total temperature and total pressure with an improved and known degree of accuracy. For example, it may be used in exhaust gas flows in aerospace, automotive, power generation or chemical engineering industries or for air flows over structures in environmental industries. It may also be used for any other gas flows in these industries. The probe 40 may be provided on the rotating blades of a wind turbine. Advantageously these rotate relatively slowly and therefore there are minimal centrifugal forces to affect the pressure measurement taken by the temperature and pressure probe 40.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A temperature and pressure probe comprising:
   an elongate outer tube having a peripheral wall, a first open end and a second closed end; the outer tube thereby defining an outer cavity;
   an elongate inner tube having a peripheral wall, a first open end and a second closed end; the inner tube thereby defining an inner cavity; the inner tube being located wholly within the outer cavity and being spaced from the outer tube peripheral wall and the outer tube second end;
   a temperature sensor located in the inner cavity;
   a pressure sensor located in the outer cavity; and
   a vent pipe coupled between the peripheral wall of the inner tube and the peripheral wall of the outer tube, the vent pipe having a first end open to the inner cavity and a second end open to vent outside the probe.

2. The probe as claimed in claim 1 wherein the peripheral walls of the inner and outer tubes are spaced apart by a constant distance.

3. The probe as claimed in claim 1 wherein the peripheral wall of the outer tube is cylindrical, or is a regular polygon in cross-section and/or wherein the peripheral wall of the inner tube is cylindrical, or is a regular polygon in cross-section.

4. The probe as claimed in claim 1 wherein the peripheral wall of one or both of the outer tube and inner tube varies in cross-section between its first end and second end.

5. The probe as claimed in claim 1 wherein the first end of the peripheral wall of the outer tube comprises a chamfer towards the outer cavity and/or wherein the first end of the peripheral wall of the outer tube comprises a chamfer away from the outer cavity.

6. The probe as claimed in claim 1 further comprising a support pin extending between the peripheral wall of the outer tube and the peripheral wall of the inner tube.

7. The probe as claimed in claim 6 wherein the support pin comprises a chamfered end where it contacts the peripheral wall of the inner tube.

8. The probe as claimed in claim 6 wherein the support pin is located between the temperature sensor and the second end of the inner tube.

9. The probe as claimed in claim 6 further comprising more than one support pin.

10. The probe as claimed in claim 1 wherein the vent pipe has a cross-section that is circular, oval, elliptical, teardrop shaped, aerofoil shaped or polygonal.

11. The probe as claimed in claim 1 wherein the vent pipe extends perpendicularly to the inner tube peripheral wall and to the outer tube peripheral wall.

12. The probe as claimed in claim 1 further comprising more than one vent pipe, the vent pipes being angularly spaced around the peripheral walls to form an array and/or being longitudinally spaced along the peripheral walls between the first and second ends of the inner tube to form an array.

13. The probe as claimed in claim 12 wherein the vent pipes form a regularly spaced array.

14. The probe as claimed in claim 1 wherein the vent pipe is located between the temperature sensor and the second end of the inner tube.

15. The probe as claimed in claim 6, the one or more support pin and the vent pipe being angularly spaced around the peripheral walls to form an array, and/or being axially spaced along the peripheral walls between the first and second ends of the inner tube to form an array.

16. The probe as claimed in claim 6 further comprising more than one vent pipe, the one or more support pin and the vent pipes being angularly spaced around the peripheral walls to form an array, and/or being axially spaced along the peripheral walls between the first and second ends of the inner tube to form an array.

17. The probe as claimed in claim 1 wherein the pressure sensor is mounted in the second end of the outer tube; or in the peripheral wall of the outer tube towards the second end.

18. An arrangement comprising an array of probes as claimed in claim 1.

19. A gas turbine engine comprising a probe as claimed in claim 1.

20. A gas turbine engine comprising an arrangement as claimed in claim 18.

\* \* \* \* \*